United States Patent
Bai et al.

(10) Patent No.: US 11,956,807 B2
(45) Date of Patent: Apr. 9, 2024

(54) MISS-DETECTION DETERMINATION METHOD, TERMINAL AND NETWORK DEVICE

(71) Applicant: DATANG MOBILE COMMUNICATIONS EQUIPMENT CO., LTD., Beijing (CN)

(72) Inventors: Wei Bai, Beijing (CN); Xuejuan Gao, Beijing (CN); Tony Ekpenyong, Beijing (CN)

(73) Assignee: Datang Mobile Communications Equipment Co., Ltd., Beijing (CN)

( * ) Notice: Subject to any disclaimer, the term of this patent is extended or adjusted under 35 U.S.C. 154(b) by 454 days.

(21) Appl. No.: 17/421,914

(22) PCT Filed: Jan. 10, 2020

(86) PCT No.: PCT/CN2020/071368
§ 371 (c)(1),
(2) Date: Jul. 9, 2021

(87) PCT Pub. No.: WO2020/143753
PCT Pub. Date: Jul. 16, 2020

(65) Prior Publication Data
US 2022/0030582 A1 Jan. 27, 2022

(30) Foreign Application Priority Data
Jan. 11, 2019 (CN) .......................... 201910028267.4

(51) Int. Cl.
*H04W 56/00* (2009.01)
*H04L 5/00* (2006.01)
(Continued)

(52) U.S. Cl.
CPC .......... *H04W 72/51* (2023.01); *H04L 5/0051* (2013.01); *H04L 5/0053* (2013.01); *H04W 72/0446* (2013.01); *H04W 72/21* (2023.01)

(58) Field of Classification Search
CPC . H04W 72/51; H04W 72/21; H04W 72/0446; H04L 5/0051; H04L 5/0053
(Continued)

(56) References Cited

U.S. PATENT DOCUMENTS

| 2011/0080880 A1 | 4/2011 | Yin et al. |
| 2018/0279385 A1 | 9/2018 | Au et al. |

(Continued)

FOREIGN PATENT DOCUMENTS

| CN | 107872298 A | 4/2018 |
| CN | 107995636 A | 5/2018 |

(Continued)

OTHER PUBLICATIONS

"Zhang, Information Transmission Device, Method and Communication System, May 11, 2018, WO 2018081969" (Year: 2016).*

(Continued)

*Primary Examiner* — Sai Ming Chan
(74) *Attorney, Agent, or Firm* — Harness, Dickey & Pierce, P.L.C.

(57) ABSTRACT

A miss-detection determination method, a terminal and a network device are provided. The miss-detection determination method includes: sending a target sequence or signal to a network device in an uplink grant-free transmission occasion; determining that no miss-detection occurs in the network device in a case that miss-detection indication information is received from the network device within a preset time period after sending the target sequence or signal, otherwise, determining that miss-detection occurs in the network device.

18 Claims, 3 Drawing Sheets

(51) Int. Cl.
*H04W 72/0446* (2023.01)
*H04W 72/21* (2023.01)
*H04W 72/51* (2023.01)

(58) Field of Classification Search
USPC .......................................................... 370/329
See application file for complete search history.

(56) References Cited

U.S. PATENT DOCUMENTS

| | | |
|---|---|---|
| 2019/0223203 A1 | 7/2019 | Zhang et al. |
| 2019/0254052 A1 | 8/2019 | Liu et al. |
| 2019/0349146 A1 | 11/2019 | Wu et al. |
| 2020/0045694 A1 | 2/2020 | Yan et al. |
| 2020/0067655 A1 | 2/2020 | Zheng et al. |
| 2020/0068598 A1 | 2/2020 | Takeda et al. |
| 2020/0213901 A1 | 7/2020 | Yoshimoto et al. |
| 2021/0306107 A1* | 9/2021 | Yin .................... H04W 72/23 |

FOREIGN PATENT DOCUMENTS

| | | |
|---|---|---|
| CN | 108207020 A | 6/2018 |
| CN | 108365925 A | 8/2018 |
| CN | 108738135 A | 11/2018 |
| CN | 108809541 A | 11/2018 |
| CN | 108811087 A | 11/2018 |
| EP | 3641182 A1 | 4/2020 |
| WO | WO-2018/0203401 A1 | 11/2018 |
| WO | WO-2018/230701 A1 | 12/2018 |

OTHER PUBLICATIONS

"Li, A Adjusting Camera Focus Method and Device in the Video Communication, Jun. 1, 2016, CN 10563627" (Year: 2015).*
"Tiirola, For Providing Dynamic Uplink-downlink to the User Equipment Reconfiguration Information Method, Device and Computer Program Product, Mar. 16, 2016, CN 105409312" (Year: 2014).*
OPPO, "Grant free transmission enhancement", Agenda item 7.2.6.3, 3GPP TSG RAN WG1 Meeting #95, R1-1812820, Nov. 12-16, 2018, Spokane, USA.
ZTE, "Enhancement for UL grant-free transmissions", Agenda item 7.2.6.3, 3GPP TG RAN WG1 Meeting #95, R1-1813884, Nov. 12-16, 2018, Spokane, USA.
Extended European Search Report dated Feb. 22, 2022 for International Patent Application No. 20739194.7.
Office Action dated Dec. 3, 2020 in Chinese Application No. 201910028267.4.
International Preliminary Report on Patentability dated Jul. 22, 2021 in International Application No. PCT/CN2020/071368.
International Search Report dated Mar. 30, 2020 in International Application No. PCT/CN2020/071368.
"NTT Docomo, Inc.," "HARQ-ACK feedback," 3GPP TSG RAN WG1 NR Ad-Hoc#3, R1-1716105, Sep. 21, 2017.

* cited by examiner

MISS-DETECTION DETERMINATION METHOD, TERMINAL AND NETWORK DEVICE

CROSS-REFERENCE TO RELATED APPLICATIONS

This application is the U.S. national phase of PCT Application No. PCT/CN2020/071368 filed on Jan. 10, 2020, which claims a priority to Chinese patent application No. 201910028267.4 filed in China on Jan. 11, 2019, the disclosures of which are incorporated in their entirety by reference herein.

TECHNICAL FIELD

The present disclosure relates to the technical field of communications application, and in particular, relates to a miss-detection determination method, a terminal and a network device.

BACKGROUND

With development and change of requirements of mobile communication services, many organizations such as 3GPP have begun to research new radio communication systems (i.e., 5G NR, 5 Generation New RAT) for future mobile communication systems. In 5G NR systems, an important requirement is low-latency and high-reliability communication, and transmission schemes such as ultra reliable and low latency communication (Ultra Reliable and Low Latency Communication, URLLC) have emerged. It is relatively easy to meet the low latency requirement alone or to meet the high reliability requirement alone. However, it is difficult to meet both the low-latency requirement and the high-reliability requirement at the same time, which are usually met with the price of high complexity.

For URLLC services, an uplink grant-free scheme will be supported in NR standards to reduce air interface transmission latency, and repeated transmission scheme will be supported to increase reliability.

For the URLLC services, there exists a method of determining whether miss-detection occurs, which is based on explicit hybrid automatic repeat request (Hybrid Automatic Repeat ReQuest, HARQ) acknowledgement (ACK) feedback. However, HARQ feedback may consume a large amount of downlink control signaling resources, resulting in a problem of insufficient downlink control signaling resources.

SUMMARY

The present disclosure is to provide a miss-detection determination method, a terminal, and a network device, so as to avoid the problem that miss-detection determination methods in the related technologies need to consume a relatively large amount of downlink control signaling resources.

In order to achieve the above object, the present disclosure provides a miss-detection determination method, and the method is applied to a terminal and includes: sending a target sequence or signal to a network device in an uplink grant-free transmission occasion; and determining that no miss-detection occurs in the network device in a case that miss-detection indication information is received from the network device within a preset time period after sending the target sequence or signal, and determining that miss-detection occurs in the network device in a case that the miss-detection indication information is not received from the network device within the preset time period after sending the target sequence or signal.

Subsequent to the determining that no miss-detection occurs in the network device, the method further includes: in an uplink grant-free transmission occasion, starting to send a physical uplink shared channel (PUSCH) or continuing sending a PUSCH.

Subsequent to, in the uplink grant-free transmission occasion, the starting to send the PUSCH or continuing sending the PUSCH, the method further includes: sending an initial transmission of the PUSCH, on a resource used for PUSCH retransmission that is indicated by the miss-detection indication information.

Subsequent to the determining that the miss-detection occurs in the network device, the method further includes: in an uplink grant-free transmission occasion, not sending a PUSCH or stopping sending a PUSCH.

The target sequence or signal is a predetermined miss-detection test sequence, or the target sequence or signal is a sequence formed by a combination of a demodulation reference signal (DMRS) and a void PUSCH.

Subsequent to sending the target sequence or signal to the network device in the uplink grant-free transmission occasion, the method further includes: starting a timer, where a timing length of the timer is a duration corresponding to the preset time period; where, the determining that no miss-detection occurs in the network device in a case that the miss-detection indication information is received from the network device within the preset time period after sending the target sequence or signal, and determining that the miss-detection occurs in the network device in a case that the miss-detection indication information is not received from the network device within the preset time period after sending the target sequence or signal, includes: determining that no miss-detection occurs in the network device in a case that the miss-detection indication information is received from the network device before the timer expires, and determining that the miss-detection occurs in the network device in a case that the miss-detection indication information is not received from the network device before the timer expires.

Prior to sending the target sequence or signal to the network device in the uplink grant-free transmission occasion, the method further includes: selecting, from uplink grant-free transmission occasions, a transmission occasion that is before a time domain position corresponding to a PUSCH set and is closest to the time domain position corresponding to the PUSCH set, as a transmission occasion for the target sequence or signal, where the PUSCH set includes at least one PUSCH; or selecting a transmission occasion for the target sequence or signal from uplink grant-free transmission occasions according to a preset period; sending the target sequence or signal in the selected transmission occasion for the target sequence or signal.

Prior sending the target sequence or signal to the network device in the uplink grant-free transmission occasion, the method further includes: receiving first configuration information, where the first configuration information includes configuration information about the uplink grant-free transmission occasion; determining the uplink grant-free transmission occasion according to the first configuration information.

The sending the target sequence or signal to the network device in the uplink grant-free transmission occasion includes: receiving configuration signaling, where the configuration signaling carries second configuration information; sending the target sequence or signal to the network device in the uplink grant-free transmission occasion in a case that the second configuration information indicates that a transmission of the target sequence or signal is supported.

The configuration signaling is one of: broadcast signaling, higher layer signaling, or layer 1 control signaling.

In order to achieve the above object, some embodiments of the present disclosure provide a miss-detection determination method, and the method is applied to a network device and includes: detecting a target sequence or signal in an uplink grant-free transmission occasion, to obtain a detection result; and feeding back miss-detection indication information to a terminal in a case that the detection result is that the target sequence or signal is detected, and not feeding back the miss-detection indication information to the terminal in a case that the detection result is that the target sequence or signal is not detected.

The target sequence or signal is a predetermined miss-detection test sequence, or the target sequence or signal is a sequence formed by a combination of a demodulation reference signal (DMRS) and a void PUSCH.

The feeding back the miss-detection indication information to the terminal in a case that the target sequence or signal is detected includes: feeding back the miss-detection indication information to the terminal in a case that a predetermined miss-detection test sequence is detected.

The feeding back the miss-detection indication information to the terminal in a case that the target sequence or signal is detected includes: continuing performing reception of a physical uplink shared channel (PUSCH) in a case that a demodulation reference signal (DMRS) is detected; feeding back the miss-detection indication information to the terminal in a case that the PUSCH is not successfully received.

The feeding back the miss-detection indication information to the terminal includes: sending predetermined miss-detection indication information to the terminal by using a predetermined downlink channel; or, sending a negative acknowledgement (NACK) message to the terminal by using a predetermined downlink channel; or, sending downlink control information to the terminal by using a physical downlink control channel (PDCCH), where the downlink control information is used to schedule retransmission of a PUSCH.

Prior to detecting the target sequence or signal in the uplink grant-free transmission occasion, to obtain the detection result, the method further includes: sending first configuration information, where the first configuration information includes configuration information about the uplink grant-free transmission occasion.

Prior to detecting the target sequence or signal in the uplink grant-free transmission occasion, to obtain the detection result, the method further includes: sending configuration signaling, where the configuration signaling carries second configuration information, and the second configuration information is used to indicate whether the terminal supports a transmission of the target sequence or signal.

The miss-detection determination method further includes: determining the quantity of transmissions of the miss-detection indication information according to a service latency requirement or a standard agreement in a case that the detection result is that the target sequence or signal is detected.

In order to achieve the above object, some embodiments of the present disclosure further provide a terminal, including a transceiver, a memory, a processor and a program stored in the memory and executable on the processor, where the processor executes the program to implement following steps: sending a target sequence or signal to a network device in an uplink grant-free transmission occasion; and determining that no miss-detection occurs in the network device in a case that miss-detection indication information is received from the network device within a preset time period after sending the target sequence or signal, and determining that miss-detection occurs in the network device in a case that the miss-detection indication information is not received from the network device within the preset time period after sending the target sequence or signal.

The processor executes the program to further implement following step: in an uplink grant-free transmission occasion, starting to send a physical uplink shared channel (PUSCH) or continuing sending a PUSCH.

The processor executes the program to further implement following step: sending an initial transmission of the PUSCH, on a resource used for PUSCH retransmission that is indicated by the miss-detection indication information.

The processor executes the program to further implement following step: in an uplink grant-free transmission occasion, not sending a PUSCH or stopping sending a PUSCH.

The target sequence or signal is a predetermined miss-detection test sequence, or the target sequence or signal is a sequence formed by a combination of a demodulation reference signal (DMRS) and a void PUSCH.

The processor executes the program to further implement following steps: starting a timer, where a timing length of the timer is a duration corresponding to the preset time period; where the determining that no miss-detection occurs in the network device in a case that the miss-detection indication information is received from the network device within the preset time period after sending the target sequence or signal, and determining that the miss-detection occurs in the network device in a case that the miss-detection indication information is not received from the network device within the preset time period after sending the target sequence or signal includes: determining that no miss-detection occurs in the network device in a case that the miss-detection indication information is received from the network device before the timer expires, and determining that the miss-detection occurs in the network device in a case that the miss-detection indication information is not received from the network device before the timer expires.

The processor executes the program to further implement following steps: selecting, from uplink grant-free transmission occasions, a transmission occasion that is before a time domain position corresponding to a PUSCH set and is closest to the time domain position corresponding to the PUSCH set, as a transmission occasion for the target sequence or signal, where the PUSCH set includes at least one PUSCH; or selecting a transmission occasion for the target sequence or signal from uplink grant-free transmission occasions according to a preset period; sending the target sequence or signal in the selected transmission occasion for the target sequence or signal.

The processor executes the program to further implement following steps: receiving first configuration information, where the first configuration information includes configuration information about the uplink grant-free transmission occasion; determining the uplink grant-free transmission occasion according to the first configuration information.

The processor executes the program to further implement following steps: receiving configuration signaling, where the configuration signaling carries second configuration information; sending the target sequence or signal to the network device in the uplink grant-free transmission occasion in a case that the second configuration information indicates that a transmission of the target sequence or signal is supported.

The configuration signaling is one of: broadcast signaling, higher layer signaling, or layer 1 control signaling.

In order to achieve the above object, some embodiments of the present disclosure further provides a computer readable storage medium having a computer program stored thereon, where the computer program, when being executed by a processor, implements the steps of the miss-detection determination method applied to the terminal as described above.

In order to achieve the above object, some embodiments of the present disclosure further provide a network device, including a transceiver, a memory, a processor and a program stored in the memory and executable on the processor, where the processor executes the program to implement following steps: detecting a target sequence or signal in an uplink grant-free transmission occasion, to obtain a detection result; and feeding back miss-detection indication information to a terminal in a case that the detection result is that the target sequence or signal is detected, and not feeding back the miss-detection indication information to the terminal in a case that the detection result is that the target sequence or signal is not detected.

The target sequence or signal is a predetermined miss-detection test sequence, or the target sequence or signal is a sequence formed by a combination of a demodulation reference signal (DMRS) and a void PUSCH.

The processor executes the program to further implement following step: feeding back the miss-detection indication information to the terminal in a case that a predetermined miss-detection test sequence is detected.

The processor executes the program to further implement following steps: continuing performing reception of a physical uplink shared channel (PUSCH) in a case that a demodulation reference signal (DMRS) is detected; feeding back the miss-detection indication information to the terminal in a case that the PUSCH is not successfully received.

The processor executes the program to further implement following steps: sending predetermined miss-detection indication information to the terminal by using a predetermined downlink channel; or, sending a negative acknowledgement (NACK) message to the terminal by using a predetermined downlink channel; or, sending downlink control information to the terminal by using a physical downlink control channel (PDCCH), where the downlink control information is used to schedule retransmission of a PUSCH.

The processor executes the program to further implement following step: sending first configuration information, where the first configuration information includes configuration information about the uplink grant-free transmission occasion.

The processor executes the program to further implement following step: sending configuration signaling, where the configuration signaling carries second configuration information, and the second configuration information is used to indicate whether the terminal supports a transmission of the target sequence or signal.

The processor executes the program to further implement following step: determining the quantity of transmissions of the miss-detection indication information according to a service latency requirement or a standard agreement in a case that the detection result is that the target sequence or signal is detected.

In order to achieve the above object, some embodiments of the present disclosure further provides a computer readable storage medium having a computer program stored thereon, where the computer program, when being executed by a processor, implements the steps of the miss-detection determination method applied to the network device as described above.

In order to achieve the above object, some embodiments of the present disclosure provide a terminal and includes: a first sending module, configured to send a target sequence or signal to a network device in an uplink grant-free transmission occasion; and a first determination module, configured to: determine that no miss-detection occurs in the network device in a case that miss-detection indication information is received from the network device within a preset time period after sending the target sequence or signal, and determine that miss-detection occurs in the network device in a case that the miss-detection indication information is not received from the network device within the preset time period after sending the target sequence or signal.

The terminal further includes: a second sending module, configured to: on an uplink grant-free resource, start to send a physical uplink shared channel (PUSCH) or continue sending a PUSCH.

In order to achieve the above object, some embodiments of the present disclosure provide a network device and includes: a detection module, configured to detect a target sequence or signal in an uplink grant-free transmission occasion, to obtain a detection result; a feedback module, configured to feed back miss-detection indication information to a terminal in a case that the detection result is that the target sequence or signal is detected; a first processing module, configured to not feed back the miss-detection indication information to the terminal in a case that the detection result is that the target sequence or signal is not detected.

The target sequence or signal is a predetermined miss-detection test sequence, or the target sequence or signal is a sequence formed by a combination of a demodulation reference signal (DMRS) and a void PUSCH.

The embodiments the present disclosure have the following beneficial effects.

In the above technical solutions provided in the embodiments of the present disclosure, a target sequence or signal is sent to the network device in an uplink grant-free transmission occasion; it is determined that no miss-detection occurs in the network device in a case that miss-detection indication information is received from the network device within a preset time period after sending the target sequence or signal, or it is determined that miss-detection occurs in the network device in a case that miss-detection indication information is not received from the network device within the preset time period after sending the target sequence or signal. In the embodiments of the present disclosure, whether the miss-detection occurs can be determined through the detection of the target sequence or signal and the feedback of the miss-detection indication information, which consumes a relatively small amount of downlink control resources.

DETAILED DESCRIPTION

In order to facilitate understanding of the technical problems to be solved, technical solutions and advantages of the present disclosure, the present disclosure will be described in detail below with reference to the specific embodiments and the drawings.

In NR standards, the Hybrid Automatic Repeat ReQuest (HARQ) feedback scheme is as follows. a timer is set on a user equipment (User Equipment, UE) side. If a physical uplink shared channel (Physical Uplink Shared Channel, PUSCH) is received incorrectly, the base station gNB sends downlink control information (Downlink Control Information, DCI) scheduling signaling for PUSCH retransmission before the timer expires, to instruct the UE to retransmit the PUSCH; if the PUSCH is received correctly, the gNB may not provide any feedback, and the UE may automatically consider that the PUSCH has been received correctly after the timer expires.

Figure 1:
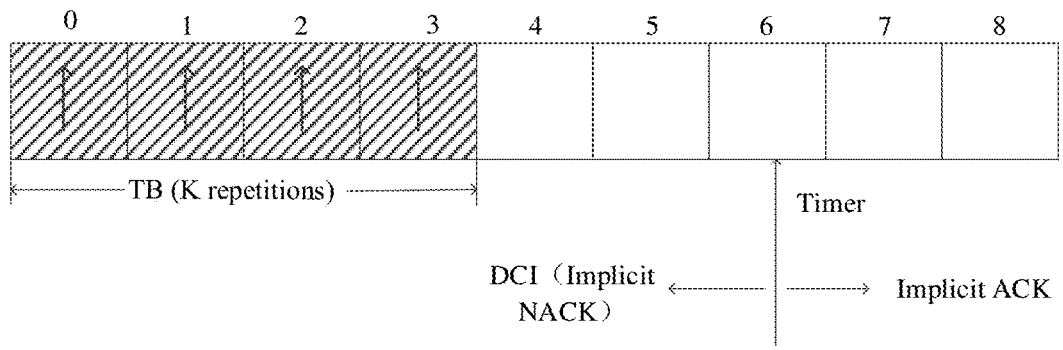
FIG. 1 is a schematic diagram of HARQ feedback.

In FIG. 1, a UE immediately starts an internal timer after completing transmission of a transport block (Transport Block, TB) (including K repetitions). Before the timer expires, in a case that gNB's DCI for scheduling retransmission of the TB is received by the UE, the UE considers that a negative acknowledgement (Negative Acknowledgement, NACK) is received, that is, the TB transmission is not received correctly; before the timer expires, in a case that the gNB's scheduling DCI for the retransmission of the TB is not received by the UE, the UE considers that an ACK is received, that is, the TB transmission is correctly received.

For a case where the UE sends a PUSCH but nothing is detected by the gNB, i.e., the gNB considering that the UE does not send any PUSCH, such a situation is called miss-detection. In this case, the gNB does not perform any HARQ feedback. After the timer expires, UE believes that the TB transmission is received correctly, which may seriously affect reliability and latency characteristic of a URLLC service.

For the URLLC service, the problem of how to determine whether miss-detection occurs needs to be solved.

Regarding approach for determining whether miss-detection occurs, currently, the conventional approach is explicit ACK feedback.

Figure 2:
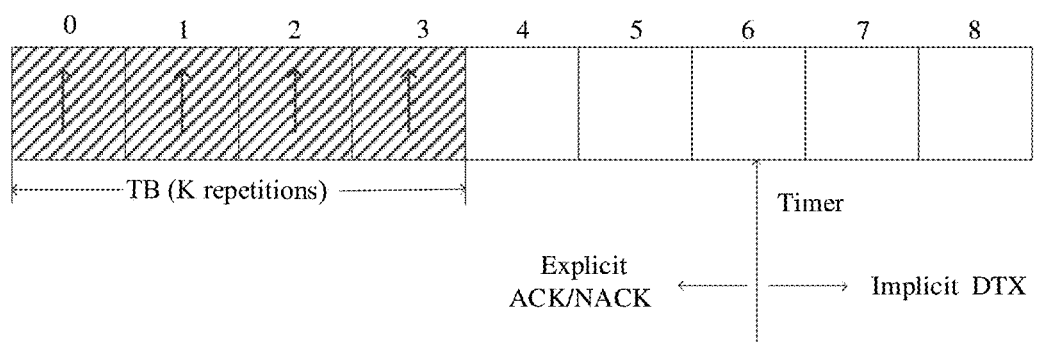
FIG. 2 is a first schematic diagram of feedback of an explicit ACK.

A first mode for the explicit ACK feedback is as follows. As shown in FIG. 2, in the uplink grant-free scheme, the UE transmits the PUSCH on a configured resource, and the gNB performs HARQ feedback according to whether the decoding is correct after receiving the PUSCH: if the reception is correct, the gNB sends an ACK to indicate that the PUSCH has been received correctly; if the reception is incorrect, the gNB sends an NACK to indicate that the PUSCH is not received correctly and needs to be retransmitted; if the PUSCH is not detected, the gNB does not send indication information, and after the timer expires, discontinuous transmission (Discontinuous Transmission, DTX) is indicated implicitly.

Figure 3:
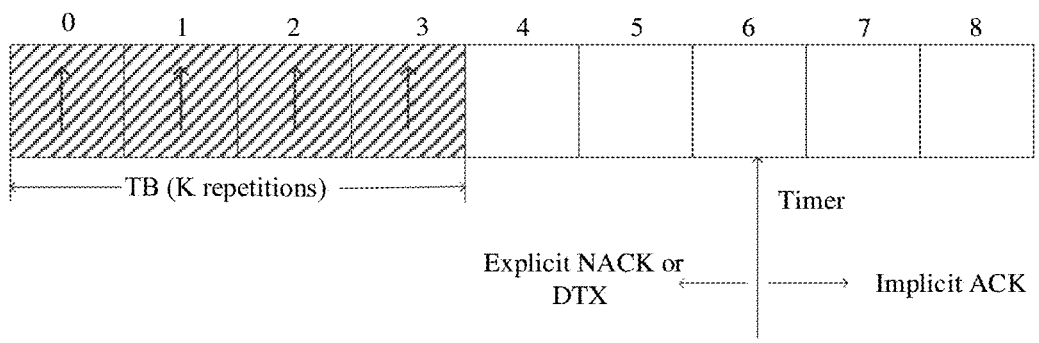
FIG. 3 is a second schematic diagram of feedback of an explicit ACK.

A second mode for the explicit ACK feedback is as follows. As shown in FIG. 3, in the uplink grant-free scheme, the UE transmits the PUSCH on a configured resource, and the gNB performs HARQ feedback according to whether the decoding is correct after receiving the PUSCH: if the reception is incorrect, the gNB sends an NACK to indicate that the PUSCH is not received correctly and needs to be retransmitted; if the PUSCH is not detected, the gNB sends DTX to indicate that there is no PUSCH transmission; if the reception is correct, the gNB does not send indication information, and after the timer expires, it is implicitly indicated that the PUSCH has been received correctly.

Disadvantage of the related technologies is that the HARQ feedback consumes a large amount of downlink control signaling resources, which makes the downlink control signaling resources insufficient. In the first mode of the explicit ACK feedback, a large amount of ACK feedback may consume a lot of PDCCH resources; and in the second mode of the explicit ACK feedback, a large amount of DTX feedback may consume a lot of PDCCH resources.

Figure 4:
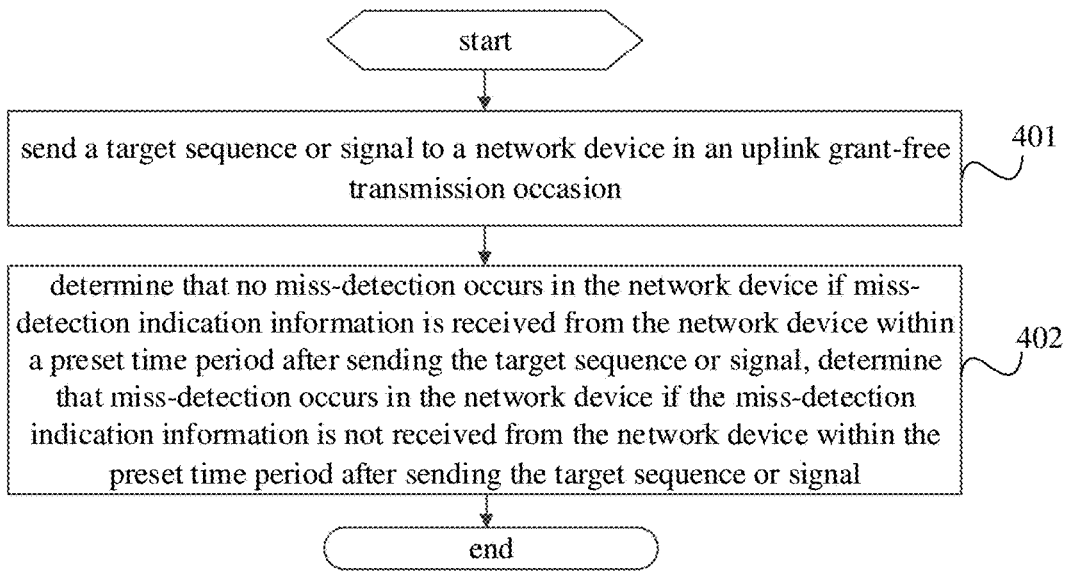
FIG. 4 is a first schematic flowchart of a miss-detection determination method according to some embodiments of the present disclosure.

In view of the above, as shown in FIG. 4, some embodiments of the present disclosure provide a miss-detection determination method, and the method is applied to a terminal and includes the following steps.

Step 401 includes: sending a target sequence or signal to a network device in an uplink grant-free transmission occasion.

The target sequence or signal is a predetermined miss-detection test sequence, or the target sequence or signal is a sequence formed by a combination of a Demodulation Reference Signal (DMRS) and a void PUSCH.

The void PUSCH means that no PUSCH data is sent at the allocated PUSCH resource location.

In a case that the terminal needs to send the PUSCH on an uplink grant-free resource, the terminal first sends the target sequence or signal to the network device in the uplink grant-free transmission occasion. The transmission of the target sequence or signal is used to test the occurrence of miss-detection under the current channel condition.

Step 402 includes: determining that no miss-detection occurs in the network device in a case that miss-detection indication information is received from the network device within a preset time period after sending the target sequence or signal, and determining that miss-detection occurs in the network device in a case that the miss-detection indication information is not received from the network device within the preset time period after sending the target sequence or signal.

The duration of the preset time period is the total time required for the base station to receive and detect the target sequence or signal, to determine, to prepare the miss-detection indication information, to wait and to send the miss-detection indication information, and for the terminal to receive and process the miss-detection indication information.

In the miss-detection determination method provided in some embodiments of the present disclosure, a target sequence or signal is sent to the network device in an uplink grant-free transmission occasion, it is determined that no miss-detection occurs in the network device in a case that miss-detection indication information is received from the network device within a preset time period after sending the target sequence or signal, or it is determined that miss-detection occurs in the network device in a case that miss-detection indication information is not received from the network device within the preset time period after sending the target sequence or signal. In some embodiments of the present disclosure, whether the miss-detection occurs may be determined through the detection of the target sequence or signal and the feedback of the miss-detection indication information, which consume less downlink control resources.

Further, subsequent to the determining that no miss-detection occurs in the network device, the method further includes: in an uplink grant-free transmission occasion, starting to send a Physical Uplink Shared Channel (PUSCH) or continuing sending a PUSCH.

Further, subsequent to, in the uplink grant-free transmission occasion, the starting to send the PUSCH or continuing sending the PUSCH, the method further includes: sending an initial transmission of the PUSCH, on a resource used for PUSCH retransmission that is indicated by the miss-detection indication information.

In some embodiments of the present disclosure, if the terminal has already started to send the PUSCH before receiving the miss-detection indication information, then, after determining that no miss-detection occurs in the network device, the terminal continues sending the PUSCH in the uplink grant-free transmission occasion.

Further, subsequent to the determining that the miss-detection occurs in the network device, the method further includes: in an uplink grant-free transmission occasion, not sending a PUSCH or stopping sending a PUSCH.

In some embodiments of the present disclosure, if the terminal has started to send the PUSCH within the preset time period after sending the target sequence or signal, the terminal stops sending the PUSCH after determining that the miss-detection occurs in the network device.

Further, subsequent to sending the target sequence or signal to the network device in the uplink grant-free transmission occasion, the method further includes: starting a timer, where a timing length of the timer is a duration corresponding to the preset time period; where the determining that no miss-detection occurs in the network device in a case that the miss-detection indication information is received from the network device within the preset time period after sending the target sequence or signal, and determining that the miss-detection occurs in the network device in a case that the miss-detection indication information is not received from the network device within the preset time period after sending the target sequence or signal includes: determining that no miss-detection occurs in the network device in a case that the miss-detection indication information is received from the network device before the timer expires, and determining that the miss-detection occurs in the network device in a case that the miss-detection indication information is not received from the network device before the timer expires.

The timer is a clock for receiving the miss-detection indication information, which may be started after sending the target sequence or signal, and stop timing after receiving the miss-detection indication information.

Further, prior to sending the target sequence or signal to the network device in the uplink grant-free transmission occasion, the method further includes: selecting, from uplink grant-free transmission occasions, a transmission occasion that is located before a time domain position corresponding to a PUSCH set and is closest to the time domain position corresponding to the PUSCH set, as a transmission occasion for the target sequence or signal, where the PUSCH set includes at least one PUSCH.

In some embodiments of the present disclosure, the PUSCH set includes at least one PUSCH, and being before the time domain position corresponding to the PUSCH set specifically refers to being before a time domain position corresponding to the first one of the at least one PUSCH in the PUSCH set.

For example, the PUSCH set includes one PUSCH. In this case, the terminal performs one transmission of the target sequence or signal before a transport block. In a case that the PUSCH set includes multiple PUSCHs, the terminal may perform one transmission of the target sequence or signal before a burst of service data, where the burst of service data is transmitted by the PUSCH set formed by the multiple PUSCHs. The multiple PUSCHs may be continuous or non-continuous in time domain position.

Optionally, a transmission occasion for the target sequence or signal is selected from uplink grant-free transmission occasions according to a preset period.

For example, the terminal selects transmission occasion(s) for the target sequence or signal according to the preset period, and transmits the target sequence or signal in the selected transmission occasion(s), that is, the target sequence or signal is transmitted according to the preset period. In a case that a transmission occasion for the target sequence or signal overlaps a transmission occasion for the PUSCH, the one with a higher priority may be selected and transmitted, and the other one may be discarded.

The target sequence or signal is sent in the selected transmission occasion for the target sequence or signal.

Further, prior to sending the target sequence or signal to the network device in the uplink grant-free transmission occasion, the method further includes: receiving first configuration information, where the first configuration information includes configuration information about the uplink grant-free transmission occasion; determining the uplink grant-free transmission occasion according to the first configuration information.

It should be noted that, for a Type 2 uplink grant-free transmission, it is needed to receive activation signaling for uplink grant-free transmission.

The first configuration information may be specifically sent via Radio Resource Control (RRC) signaling.

Further, the sending the target sequence or signal to the network device in the uplink grant-free transmission occasion includes: receiving configuration signaling, where the configuration signaling carries second configuration information; sending the target sequence or signal to the network device in the uplink grant-free transmission occasion in a case that the second configuration information indicates that a transmission of the target sequence or signal is supported.

The above configuration signaling is one of broadcast signaling, higher layer signaling, or layer 1 control signaling.

The miss-detection determination method in some embodiments of the present disclosure realizes the detection of the transmission channel condition through the transmission of the target sequence or signal. The base station informs the terminal whether miss-detection is considered to be ignorable for the current channel condition, through the detection of the target sequence or signal and the corresponding feedback of the miss-detection indication information. If the corresponding miss-detection indication information is received by the terminal, it is considered that the miss-detection basically does not occur under the current channel condition, and the terminal may transmit PUSCH normally. If the corresponding miss-detection indication information is not received by the terminal, it is considered that a probability of occurrence of the miss-detection is high under the current channel condition, and the terminal may not transmit PUSCH. The method may solve the problem that HARQ feedback consumes too much downlink control signaling resources while solving miss-detection.

Figure 5:
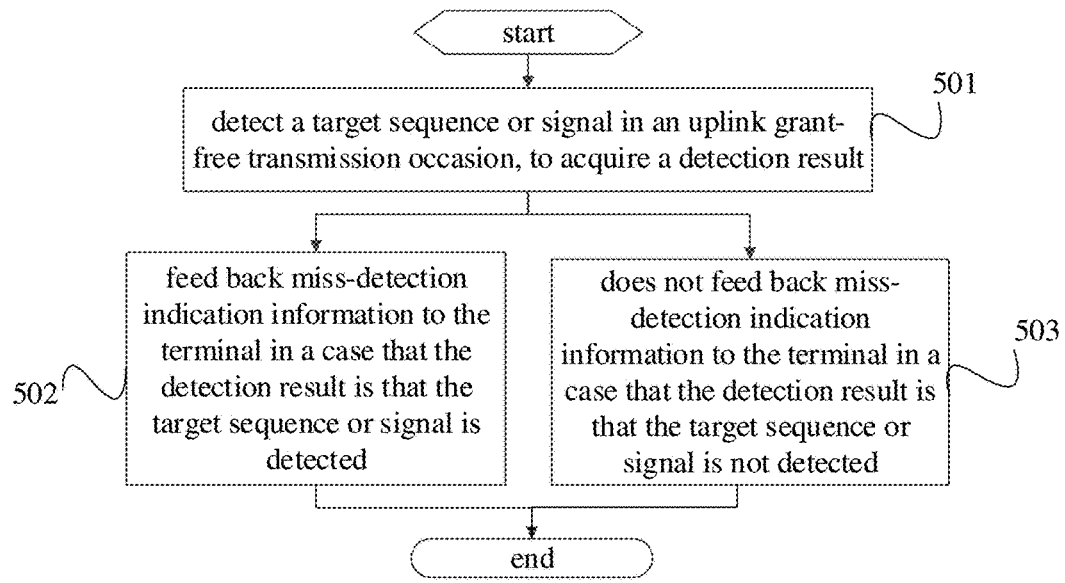
FIG. 5 is a second schematic flowchart of a miss-detection determination method according to some embodiments of the present disclosure.

As shown in FIG. 5, embodiments of the present disclosure further provide a miss-detection determination method applied to a network device, and the method includes the following steps.

Step 501 includes: detecting a target sequence or signal in an uplink grant-free transmission occasion, to obtain a detection result.

The target sequence or signal is a predetermined miss-detection test sequence, or the target sequence or signal is a sequence formed by a combination of a Demodulation Reference Signal (DMRS) and a void PUSCH.

The void PUSCH means that no PUSCH data is sent at the allocated PUSCH resource location.

Step 502 includes: feeding back miss-detection indication information to a terminal in a case that the detection result is that the target sequence or signal is detected.

The base station determines that there is no miss-detection and feeds back the miss-detection indication information to the terminal, in a case that the target sequence or signal is detected.

Step 503 includes: not feeding back the miss-detection indication information to the terminal in a case that the detection result is that the target sequence or signal is not detected.

In the miss-detection determination method provided in some embodiments of the present disclosure, detection of a target sequence or signal is performed in an uplink grant-free transmission occasion, to obtain a detection result; miss-detection indication information is fed back to the terminal in a case that the detection result is that the target sequence or signal is detected; miss-detection indication information is not fed back to the terminal in a case that the detection result is that the target sequence or signal is not detected. Some embodiments of the present disclosure may determine whether the miss-detection occurs through the detection of the target sequence or signal and the feedback of the miss-detection indication information, and consume less downlink control resources.

Feeding back the miss-detection indication information to the terminal in a case that the target sequence or signal is detected and the target sequence or signal is a predetermined miss-detection test sequence includes: feeding back the miss-detection indication information to the terminal in a case that the predetermined miss-detection test sequence is detected; feeding back miss-detection indication information to the terminal in a case that the target sequence or signal is detected and the target sequence or signal is a sequence formed by a combination of a Demodulation Reference Signal (DMRS) and a void PUSCH includes: continuing performing reception of a Physical Uplink Shared Channel (PUSCH) in a case that a DMRS is detected; feeding back the miss-detection indication information to the terminal in a case that the PUSCH is not successfully received.

In some embodiments of the present disclosure, when the DMRS is detected, reception of the PUSCH is continued, and if reception of the PUSCH is successful, the miss-detection indication information is not fed back; when the DMRS is not detected, detection of PUSCH is not performed, and miss-detection indication information is not sent.

In some embodiments of the present disclosure, the miss-detection indication information is fed back to the terminal in an explicit or implicit manner. Specifically, feeding back the miss-detection indication information to the terminal includes: sending predetermined miss-detection indication information to the terminal by using a predetermined downlink channel (explicit manner); or, sending a Negative Acknowledgement (NACK) message to the terminal by using a predetermined downlink channel (explicit manner); or sending downlink control information to the terminal by using a Physical Downlink Control Channel (PDCCH) (implicit manner), where the downlink control information is used to schedule retransmission of a PUSCH.

Further, prior to detecting the target sequence or signal in the uplink grant-free transmission occasion, to obtain the detection result, the method further includes: sending first configuration information, where the first configuration information includes configuration information about the uplink grant-free transmission occasion.

It should be noted that, for a Type 2 uplink grant-free transmission, it is needed to send activation signaling for uplink grant-free transmission.

The first configuration information may be specifically sent via Radio Resource Control (RRC) signaling.

Further, prior to detecting the target sequence or signal in the uplink grant-free transmission occasion, to obtain the detection result, the method further includes: sending configuration signaling, where the configuration signaling carries second configuration information, and the second configuration information is used to indicate whether the terminal supports a transmission of the target sequence or signal.

The above configuration signaling is one of broadcast signaling, higher layer signaling, or layer 1 control signaling.

Further, the miss-detection determination method further includes: determining the quantity of transmissions of the miss-detection indication information according to a service latency requirement or a standard agreement in a case that the detection result is that the target sequence or signal is detected.

In specific embodiments of the present disclosure, when it is determined that the miss-detection indication information (NACK information) is sent in the implicit manner, such as using a PDCCH to schedule retransmission of the PUSCH, the base station needs to limit the quantity of transmissions of the miss-detection indication information, which may be specifically implemented in the following manners:

Manner 1: the terminal may use the retransmission resource to send a new TB, and when the new TB is correctly detected by the base station, the base station may stop sending the NACK information.

Manner 2: according to the service latency requirement, the NACK information may only be sent a given quantity of times, such as once, that is, the base station sends the implicit NACK information only once.

Manner 3: according to the standard agreement, after transmission of DMRS and void PUSCH is configured, the base station sends the NACK information only once for the first detected DMRS; or, according to the standard agreement, after the predetermined miss-detection test sequence is configured, the base station sends the NACK information only once.

The miss-detection determination method of the present disclosure will be described below in combination with specific embodiments.

Embodiment 1

Behavior on the base station side is as follows:

(1) The base station sends configuration information of uplink grant-free transmission to the UE.

Corresponding to Type 2 uplink grant-free transmission, the base station needs to send activation DCI.

(2) The base station performs reception of DMRS and PUSCH in a configured uplink grant-free transmission occasion.

(3) The base station may perform the following operations:

After performing reception of the DMRS, it is determined whether the DMRS exists. If the DMRS does not exist, the base station does not send NACK information.

If the DMRS exists, the base station continues performing detection of PUSCH. If the PUSCH is correctly detected, the base station does not send NACK information; if the PUSCH is not correctly detected, the base station sends NACK information before the given timer expires, and the NACK information may be implicitly indicated by the PDCCH through which the base station schedules retransmission of the PUSCH.

Behavior on the terminal side is as follows:

(1) The terminal receives configuration information of uplink grant-free transmission sent by the base station.

Corresponding to Type 2 uplink grant-free transmission, the terminal needs to receive activation DCI to start the uplink grant-free transmission.

Figure 6:
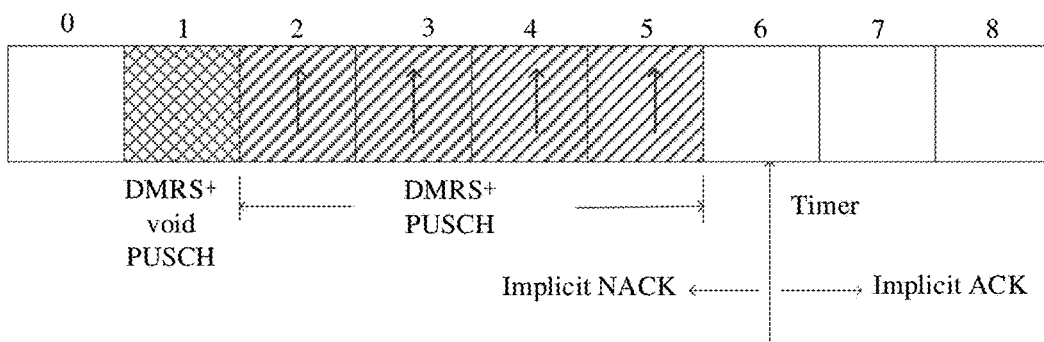
FIG. 6 is a schematic diagram of feedback of miss-detection indication information according to some embodiments of the present disclosure.

(2) The terminal performs transmission of DMRS and void PUSCH in the configured uplink grant-free transmission occasion. As shown in FIG. 6, a transmission is performed before transmission of DMRS and PUSCH (valid PUSCH).

(3) After transmission of the DMRS and void PUSCH is completed, the terminal starts a timer, and monitors whether there is NACK information before the timer expires. After the timer expires, the terminal stops monitoring whether there is NACK information.

(4) Before the timer expires, if the terminal monitors that a PDCCH schedules a retransmission of the TB of an HARQ ID corresponding to the PUSCH, i.e., equivalent NACK information, then the terminal considers that no miss-detection occurs in the base station, and may continue performing transmission of DMRS and valid PUSCH. When the downlink control signaling is monitored the terminal, the terminal stops the timer.

(5) Before the timer expires, the miss-detection indication information (NACK information) is not monitored the terminal, the terminal considers that the miss-detection occurs in the base station, and the terminal immediately stops the ongoing transmission of DMRS and valid PUSCH, and triggers a miss-detection processing flow.

Embodiment 2

Behavior on the base station side is as follows:

(1) The base station sends configuration information of uplink grant-free transmission to the UE.

Corresponding to Type 2 uplink grant-free transmission, the base station needs to send activation DCI.

(2) The base station performs reception of a predetermined miss-detection test sequence in a configured uplink grant-free transmission occasion.

(3) The base station performs the following operations:

After reception of the predetermined miss-detection test sequence is performed, it is determined whether the predetermined miss-detection test sequence exists. If it does not exist, the base station does not send the miss-detection test indication information; if the predetermined miss-detection test sequence exists, the base station sends miss-detection test indication information.

Behavior on the terminal side is as follows:

(1) The terminal receives configuration information of uplink grant-free transmission sent by the base station.

Corresponding to Type 2 uplink grant-free transmission, the terminal needs to receive activation DCI to start the uplink grant-free transmission.

(2) The terminal transmits a predetermined miss-detection test sequence in the configured uplink grant-free transmission occasion. Normally, a transmission is performed before transmission of DMRS and valid PUSCH, or periodical transmissions may be performed according to a configuration.

The terminal starts a timer after the transmission of the predetermined miss-detection test sequence is completed. Before the timer expires, the terminal monitors whether there is the miss-detection indication information. After the timer expires, the terminal stops monitoring whether there is the miss-detection indication information.

(4) Before the timer expires, if the miss-detection indication information is monitored by the terminal, then the terminal considers that no miss-detection occurs in the base station, and may continue performing transmission of DMRS and PUSCH (valid PUSCH). When the miss-detection indication information is monitored by the terminal, the terminal stops the timer.

(5) Before the timer expires, if the miss-detection indication information is not detected by the terminal, the terminal considers that the miss-detection occurs in the base station, and the terminal immediately stops the ongoing transmission of DMRS and valid PUSCH, and triggers a miss-detection processing flow.

In the miss-detection determination method provided in some embodiments of the present disclosure, detection of a target sequence or signal is performed in an uplink grant-free transmission occasion, to obtain a detection result; miss-detection indication information is fed back to the terminal in a case that the detection result is that the target sequence or signal is detected; miss-detection indication information is not fed back to the terminal in a case that the detection result is that the target sequence or signal is not detected. Some embodiments of the present disclosure may determine whether the miss-detection occurs through the detection of the target sequence or signal and the feedback of the miss-detection indication information, and consume less downlink control resources.

Figure 7:
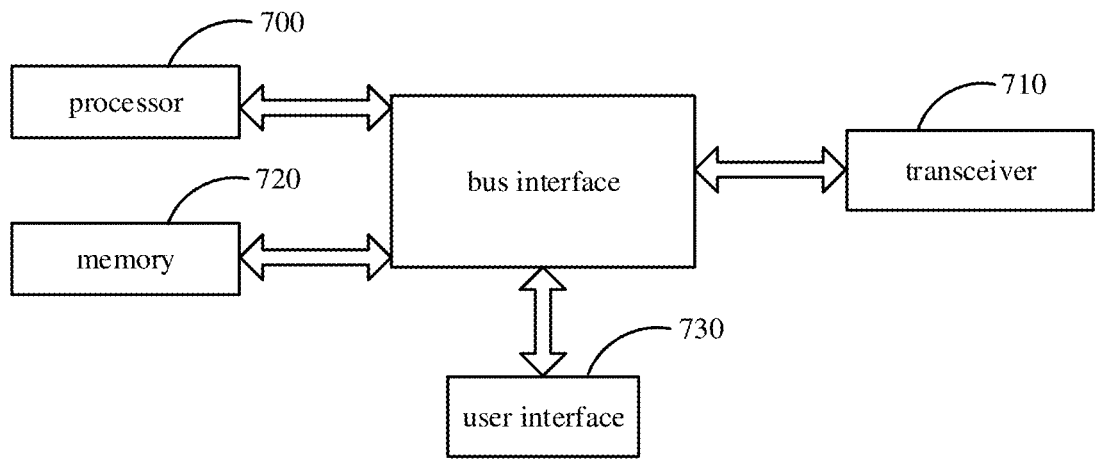
FIG. 7 is a block diagram of a terminal according to some embodiments of the present disclosure.

As shown in FIG. 7, embodiments of the present disclosure further provide a terminal, including a transceiver, a memory, a processor and a computer program stored in the memory and executable on the processor, and the processor executes the computer program to implement following steps: sending, via the transceiver, a target sequence or signal to a network device in an uplink grant-free transmission occasion; determining that no miss-detection occurs in the network device in a case that miss-detection indication information is received via the transceiver from the network device within a preset time period after sending the target sequence or signal, and determining that miss-detection occurs in the network device in a case that the miss-detection indication information is not received via the transceiver from the network device within the preset time period after sending the target sequence or signal.

In FIG. 7, a bus architecture may include any quantity of interconnected buses and bridges. Specifically, various circuits of one or more processors represented by the processor 700 and a memory represented by the memory 720 are linked together. The bus architecture may also link various other circuits such as peripheral, voltage regulator and power management circuit, which are well known in the art, and therefore a further description is not provided herein. The bus interface provides interfaces. The transceiver 710 may be multiple elements, that is, including a transmitter and a receiver, to provide a unit configured to communicate with various other apparatuses over a transmission medium. For different user devices, the user interface 730 may be an interface capable of externally and internally connecting required devices which include but not limited to a keypad, a display, a speaker, a microphone, a joystick, or the like.

The processor 700 is responsible for managing the bus architecture and general processing, and the memory 720 may store data used by the processor 700 when performing operations.

Optionally, the processor 700 is further configured to read the program in the memory 720 to execute the following step: in an uplink grant-free transmission occasion, starting to send a Physical Uplink Shared Channel (PUSCH) or continuing sending a PUSCH.

Optionally, the processor 700 is further configured to read the program in the memory 720 to execute the following step: sending an initial transmission of the PUSCH, on a resource used for PUSCH retransmission that is indicated by the miss-detection indication information.

Optionally, the processor 700 is further configured to read the program in the memory 720 to execute the following step: in an uplink grant-free transmission occasion, not sending a PUSCH or stopping sending a PUSCH.

Optionally, the target sequence or signal is a predetermined miss-detection test sequence, or the target sequence or signal is a sequence formed by a combination of a Demodulation Reference Signal (DMRS) and a void PUSCH.

Optionally, the processor 700 is further configured to read the program in the memory 720 to execute the following steps: starting a timer, where a timing length of the timer is a duration corresponding to the preset time period; where the determining that no miss-detection occurs in the network device in a case that the miss-detection indication information is received from the network device within the preset time period after sending the target sequence or signal, and determining that the miss-detection occurs in the network device in a case that the miss-detection indication information is not received from the network device within the preset time period after sending the target sequence or signal includes: determining that no miss-detection occurs in the network device in a case that the miss-detection indication information is received from the network device before the timer expires, and determining that the miss-detection occurs in the network device in a case that the miss-detection indication information is not received from the network device before the timer expires.

Optionally, the processor 700 is further configured to read the program in the memory 720 to execute the following steps: selecting, from uplink grant-free transmission occasions, a transmission occasion that is located before a time domain position corresponding to a PUSCH set and is closest to the time domain position corresponding to the PUSCH set, as a transmission occasion for the target sequence or signal, where the PUSCH set includes at least one PUSCH; or selecting a transmission occasion for the target sequence or signal from uplink grant-free transmission occasions according to a preset period; sending the target sequence or signal in the selected transmission occasion for the target sequence or signal.

Optionally, the processor 700 is further configured to read the program in the memory 720 to execute the following steps: receiving first configuration information, where the first configuration information includes configuration information about the uplink grant-free transmission occasion; determining the uplink grant-free transmission occasion according to the first configuration information.

Optionally, the processor 700 is further configured to read the program in the memory 720 to execute the following step: receiving configuration signaling, where the configuration signaling carries second configuration information; sending the target sequence or signal to the network device in the uplink grant-free transmission occasion in a case that the second configuration information indicates that a transmission of the target sequence or signal is supported.

Optionally, the configuration signaling is one of broadcast signaling, higher layer signaling, or layer 1 control signaling.

The terminal provided in some embodiments of the present disclosure sends a target sequence or signal to the network device in an uplink grant-free transmission occasion, determines that no miss-detection occurs in the network device in a case that miss-detection indication information is received from the network device within the preset time period after sending the target sequence or signal, or determines that miss-detection occurs in the network device in a case that miss-detection indication information is not received from the network device within the preset time period after sending the target sequence or signal. Some embodiments of the present disclosure may determine whether the miss-detection occurs through the detection of the target sequence or signal and the feedback of the miss-detection indication information, and consume less downlink control resources.

In some embodiments of the present disclosure, a computer readable storage medium having a computer program stored thereon is further provided, and the program is performed by a processor to implement the following steps: sending a target sequence or signal to a network device in an uplink grant-free transmission occasion; determining that no miss-detection occurs in the network device in a case that miss-detection indication information is received from the network device within a preset time period after sending the target sequence or signal, and determining that miss-detection occurs in the network device in a case that the miss-detection indication information is not received from the network device within the preset time period after sending the target sequence or signal.

When the program is executed by the processor, all implementation manners in the foregoing embodiments of the miss-detection determination method applied to the terminal side can be implemented, and the same technical effects can be achieved. To avoid redundancy, a repeated description is not provided herein.

Figure 8:
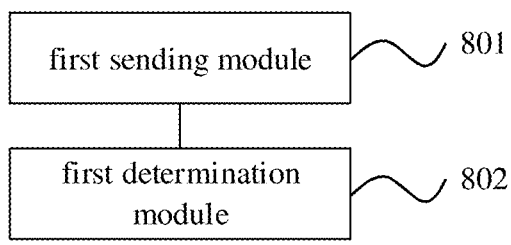
FIG. 8 is a schematic diagram of modules of a terminal according to some embodiments of the present disclosure.

As shown in FIG. 8, some embodiments of the present disclosure further provide a terminal, and the terminal includes: a first sending module 801, configured to send a target sequence or signal to a network device in an uplink grant-free transmission occasion; a first determination module 802, configured to, determine that no miss-detection occurs in the network device in a case that miss-detection indication information is received from the network device within a preset time period after sending the target sequence or signal, and determine that miss-detection occurs in the network device in a case that the miss-detection indication information is not received from the network device within the preset time period after sending the target sequence or signal.

The terminal in some embodiments of the present disclosure further includes: a second sending module, configured to: in an uplink grant-free transmission occasion, start to send a Physical Uplink Shared Channel (PUSCH) or continue sending a PUSCH.

The terminal in some embodiments of the present disclosure further includes: a third sending module, configured to: send an initial transmission of the PUSCH on a resource used for PUSCH retransmission that is indicated by the miss-detection indication information, after starting to send the PUSCH or continuing sending the PUSCH in the uplink grant-free transmission occasion.

The terminal in some embodiments of the present disclosure further includes: a second processing module, configured to: in an uplink grant-free transmission occasion, not send a PUSCH or stop sending a PUSCH.

For the terminal in some embodiments of the present disclosure, the target sequence or signal is a predetermined miss-detection test sequence, or the target sequence or signal is a sequence formed by a combination of a Demodulation Reference Signal (DMRS) and a void PUSCH.

The terminal in some embodiments of the present disclosure further includes: a starting module, configured to: after sending the target sequence or signal to the network device in the uplink grant-free transmission occasion, start a timer, where a timing length of the timer is a duration corresponding to the preset time period; the first determination module is configured to: determine that no miss-detection occurs in the network device in a case that the miss-detection indication information is received from the network device before the timer expires, and determine that the miss-detection occurs in the network device in a case that the miss-detection indication information is not received from the network device before the timer expires.

For the terminal in some embodiments of the present disclosure, the first sending module further includes: a selection submodule, configured to: select, from uplink grant-free transmission occasions, a transmission occasion that is located before a time domain position corresponding to a PUSCH set and is closest to the time domain position corresponding to the PUSCH set, as a transmission occasion for the target sequence or signal, where the PUSCH set includes at least one PUSCH; or select a transmission occasion for the target sequence or signal from uplink grant-free transmission occasions according to a preset period; a first sending submodule, configured to send the target sequence or signal in the selected transmission occasion for the target sequence or signal.

The terminal in some embodiments of the present disclosure further includes: a reception module, configured to receive first configuration information, where the first configuration information includes configuration information about the uplink grant-free transmission occasion; a second determination module, configured to determine the uplink grant-free transmission occasion according to the first configuration information.

For the terminal in some embodiments of the present disclosure, the first sending module further includes: a reception submodule, configured to receive configuration signaling, where the configuration signaling carries second configuration information; a second sending submodule, configured to send the target sequence or signal to the network device in the uplink grant-free transmission occasion in a case that the second configuration information indicates that a transmission of the target sequence or signal is supported.

For the terminal in some embodiments of the present disclosure, the configuration signaling is one of broadcast signaling, higher layer signaling, or layer 1 control signaling.

The terminal provided in some embodiments of the present disclosure sends a target sequence or signal to the network device in an uplink grant-free transmission occasion, determines that no miss-detection occurs in the network device in a case that miss-detection indication information is received from the network device within a preset time period after sending the target sequence or signal, or determines that miss-detection occurs in the network device in a case that miss-detection indication information is not received from the network device within the preset time period after sending the target sequence or signal. Some embodiments of the present disclosure may determine whether the miss-detection occurs through the detection of the target sequence or signal and the feedback of the miss-detection indication information, and consume less downlink control resources.

Figure 9:
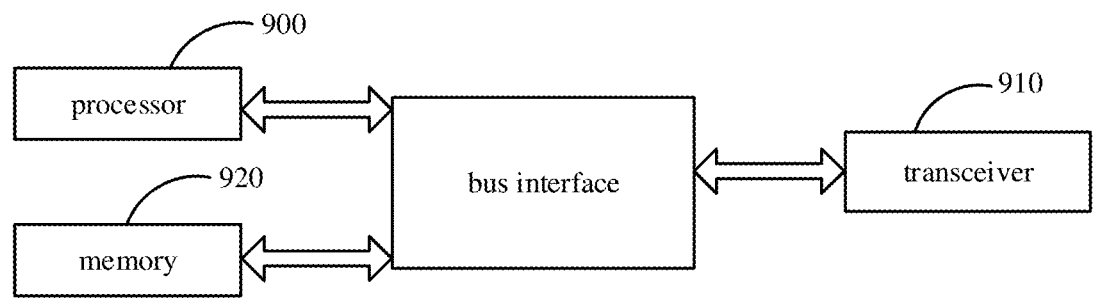
FIG. 9 is a block diagram of a network device according to some embodiments of the present disclosure.

As shown in FIG. 9, embodiments of the present disclosure also provide a network device, and the network device may be specifically a base station and include: a memory 920, a processor 900, a transceiver 910, a bus interface and a computer program stored in the memory 920 and executable by the processor 900; where the processor 900 is used to read the program in the memory 920 to execute the following process: detecting a target sequence or signal in an uplink grant-free transmission occasion, to obtain a detection result; feeding back miss-detection indication information to a terminal in a case that the detection result is that the target sequence or signal is detected, and not feeding back the miss-detection indication information to the terminal in a case that the detection result is that the target sequence or signal is not detected.

In FIG. 9, a bus architecture may include any quantity of interconnected buses and bridges. Specifically, various circuits of one or more processors represented by the processor 900 and a memory represented by the memory 920 are linked together. The bus architecture may also link various other circuits such as peripheral, voltage regulator and power management circuit, which are well known in the art, and therefore a further description is not provided herein. The bus interface provides interfaces. The transceiver 910 may be multiple elements, that is, including a transmitter and a receiver, to provide a unit configured to communicate with various other apparatuses over a transmission medium. The processor 900 is responsible for managing the bus architecture and general processing, and the memory 920 may store data used by the processor 900 when performing operations.

Optionally, the target sequence or signal is a predetermined miss-detection test sequence, or the target sequence or signal is a sequence formed by a combination of a Demodulation Reference Signal (DMRS) and a void PUSCH.

Optionally, the processor 900 executes the computer program to further implement following step: feeding back the miss-detection indication information to the terminal in a case that the predetermined miss-detection test sequence is detected.

Optionally, the processor 900 executes the computer program to further implement following steps: continuing performing reception of a Physical Uplink Shared Channel (PUSCH) in a case that a DMRS is detected; feeding back the miss-detection indication information to the terminal in a case that the PUSCH is not successfully received.

Optionally, the processor 900 executes the computer program to further implement following step: sending predetermined miss-detection indication information to the terminal by using a predetermined downlink channel; or, sending a Negative Acknowledgement (NACK) message to the terminal by using a predetermined downlink channel; or sending downlink control information to the terminal by using a Physical Downlink Control Channel (PDCCH), where the downlink control information is used to schedule retransmission of a PUSCH.

Optionally, the processor 900 executes the computer program to further implement following step: sending first configuration information, where the first configuration information includes configuration information about the uplink grant-free transmission occasion.

Optionally, the processor 900 executes the computer program to further implement following step: sending configuration signaling, where the configuration signaling carries second configuration information, and the second configuration information is used to indicate whether the terminal supports a transmission of the target sequence or signal.

Optionally, the processor 900 executes the computer program to further implement following step: determining the quantity of transmissions of the miss-detection indication information according to a service latency requirement or a standard agreement in a case that the detection result is that the target sequence or signal is detected.

The network device provided in some embodiments of the present disclosure detects a target sequence or signal in an uplink grant-free transmission occasion, to obtain a detection result; feeds back miss-detection indication information to the terminal in a case that the detection result is that the target sequence or signal is detected; does not feed back the miss-detection indication information to the terminal in a case that the detection result is that the target sequence or signal is not detected. Some embodiments of the present disclosure may determine whether the miss-detection occurs through the detection of the target sequence or signal and the feedback of the miss-detection indication information, and consume less downlink control resources.

In some embodiments of the present disclosure, a computer readable storage medium having a computer program stored thereon is further provided, the program is performed by a processor to implement the following steps: detecting a target sequence or signal in an uplink grant-free transmission occasion, to obtain a detection result; feeding back miss-detection indication information to the terminal in a case that the detection result is that the target sequence or signal is detected, and not feeding back the miss-detection indication information to the terminal in a case that the detection result is that the target sequence or signal is not detected.

When the program is executed by the processor, all implementation manners in the foregoing embodiments of the miss-detection determination method applied to the network device side can be implemented, and the same technical effect can be achieved. To avoid redundancy, a repeated description is not provided herein.

Figure 10:
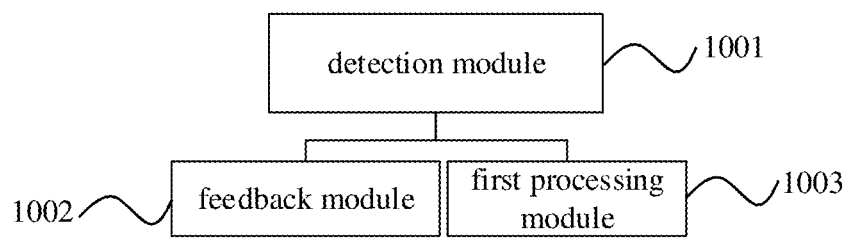
FIG. 10 is a schematic diagram of modules of a network device according to some embodiments of the present disclosure.

As shown in FIG. 10, some embodiments the present disclosure further provide a network device, and the network device includes: a detection module 1001, configured to detect a target sequence or signal in an uplink grant-free transmission occasion, to obtain a detection result; a feedback module 1002, configured to feed back miss-detection indication information to a terminal in a case that the detection result is that the target sequence or signal is detected; a first processing module 1003, configured to not feed back the miss-detection indication information to the terminal in a case that the detection result is that the target sequence or signal is not detected.

For the network device in some embodiments of the present disclosure, the target sequence or signal is a predetermined miss-detection test sequence, or the target sequence or signal is a sequence formed by a combination of a Demodulation Reference Signal (DMRS) and a void PUSCH.

For the network device in some embodiments of the present disclosure, the feedback module is configured to feed back the miss-detection indication information to the terminal in a case that a predetermined miss-detection test sequence is detected.

For the network device in some embodiments of the present disclosure, the feedback module further includes: a first detection submodule, configured to continue performing reception of a Physical Uplink Shared Channel (PUSCH) in a case that a DMRS is detected; a feedback submodule, configured to feed back the miss-detection indication information to the terminal in a case that the PUSCH is not successfully received.

For the network device in some embodiments of the present disclosure, the feedback module is configured to send predetermined miss-detection indication information to the terminal by using a predetermined downlink channel; or, send a Negative Acknowledgement (NACK) message to the terminal by using a predetermined downlink channel; or send downlink control information to the terminal by using a Physical Downlink Control Channel (PDCCH), where the downlink control information is used to schedule retransmission of a PUSCH.

The network device in some embodiments of the present disclosure further includes: a fourth sending module, configured to: send first configuration information before detecting the target sequence or signal in the uplink grant-free transmission occasion to obtain the detection result, where the first configuration information includes configuration information about the uplink grant-free transmission occasion.

The network device in some embodiments of the present disclosure further includes: a fifth sending module, configured to: send configuration signaling before detecting the target sequence or signal in the uplink grant-free transmission occasion to obtain the detection result, where the configuration signaling carries second configuration information, and the second configuration information is used to indicate whether the terminal supports a transmission of the target sequence or signal.

The network device in some embodiments of the present disclosure further includes: a third determination module, configured to determine the quantity of transmissions of the miss-detection indication information according to a service latency requirement or a standard agreement in a case that the detection result is that the target sequence or signal is detected.

The network device provided in some embodiments of the present disclosure detects a target sequence or signal in an uplink grant-free transmission occasion, to obtain a detection result; feeds back miss-detection indication information to the terminal in a case that the detection result is that the target sequence or signal is detected; does not feed back the miss-detection indication information to the terminal in a case that the detection result is that the target sequence or signal is not detected. Some embodiments of the present disclosure may determine whether the miss-detection occurs through the detection of the target sequence or signal and the feedback of the miss-detection indication information, and consume less downlink control resources.

In various embodiments of the present disclosure, it should be understood that the size of the serial numbers of the above processes does not mean the order of execution, and the execution order of each process needs to be determined by its function and internal logic, and should not constitute any limitation on the implementation process of the embodiments of the present disclosure.

The descriptions above are some embodiments of the disclosure, it should be noted that those skilled in the art may make various improvements and polishments without departing from principles described in the present disclosure, and the various improvements and polishments fall within the protection scope of the present disclosure.

What is claimed is:

1. A miss-detection determination method, applied to a terminal, comprising:
    sending a target sequence to a network device in an uplink grant-free transmission occasion; and
    determining that no miss-detection occurs in the network device in a case that miss-detection indication information is received from the network device within a preset time period after sending the target sequence, and determining that miss-detection occurs in the network device in a case that the miss-detection indication information is not received from the network device within the preset time period after sending the target sequence;
    wherein subsequent to the determining that no miss-detection occurs in the network device, the method further comprises: in an uplink grant-free transmission occasion, starting to send a physical uplink shared channel (PUSCH) or continuing sending a PUSCH.

2. The miss-detection determination method according to claim 1, wherein subsequent to, in the uplink grant-free transmission occasion, the starting to send the PUSCH or continuing sending the PUSCH, the method further comprises: sending an initial transmission of the PUSCH, on a resource used for PUSCH retransmission that is indicated by the miss-detection indication information.

3. The miss-detection determination method according to claim 1, wherein subsequent to the determining that the miss-detection occurs in the network device, the method further comprises: in an uplink grant-free transmission occasion, not sending a PUSCH or stopping sending a PUSCH.

4. The miss-detection determination method according to claim 1, wherein the target sequence is a predetermined miss-detection test sequence, or the target sequence is a sequence formed by a combination of a demodulation reference signal (DMRS) and a void PUSCH.

5. The miss-detection determination method according to claim 1, wherein subsequent to sending the target sequence to the network device in the uplink grant-free transmission occasion, the method further comprises:
    starting a timer, wherein a timing length of the timer is a duration corresponding to the preset time period;
    wherein, the determining that no miss-detection occurs in the network device in a case that the miss-detection indication information is received from the network device within the preset time period after sending the target sequence, and determining that the miss-detection occurs in the network device in a case that the miss-detection indication information is not received from the network device within the preset time period after sending the target sequence, comprises:
    determining that no miss-detection occurs in the network device in a case that the miss-detection indication information is received from the network device before the timer expires, and determining that the miss-detection occurs in the network device in a case that the miss-detection indication information is not received from the network device before the timer expires.

6. The miss-detection determination method according to claim 1, wherein the sending the target sequence to the network device in the uplink grant-free transmission occasion comprises:
    selecting, from uplink grant-free transmission occasions, a transmission occasion that is before a time domain position corresponding to a PUSCH set and is closest to the time domain position corresponding to the PUSCH set, as a transmission occasion for the target sequence, wherein the PUSCH set comprises at least one PUSCH; or selecting a transmission occasion for the target sequence from uplink grant-free transmission occasions according to a preset period;
    sending the target sequence in the selected transmission occasion for the target sequence.

7. The miss-detection determination method according to claim 1, wherein prior to sending the target sequence to the network device in the uplink grant-free transmission occasion, the method further comprises:
    receiving first configuration information, wherein the first configuration information comprises configuration information about the uplink grant-free transmission occasion;
    determining the uplink grant-free transmission occasion according to the first configuration information.

8. The miss-detection determination method according to claim 1, wherein the sending the target sequence to the network device in the uplink grant-free transmission occasion comprises:
    receiving configuration signaling, wherein the configuration signaling carries second configuration information;
    sending the target sequence to the network device in the uplink grant-free transmission occasion in a case that the second configuration information indicates that a transmission of the target sequence is supported.

9. A miss-detection determination method, applied to a network device, comprising:
    detecting a target sequence in an uplink grant-free transmission occasion, to obtain a detection result; and
    feeding back miss-detection indication information to a terminal in a case that the detection result is that the target sequence is detected, and not feeding back the miss-detection indication information to the terminal in a case that the detection result is that the target sequence is not detected;

wherein subsequent to the feeding back miss-detection indication information to the terminal, the method further comprises: in an uplink grant-free transmission occasion, starting to receive a physical uplink shared channel (PUSCH), or continuing receiving a PUSCH.

10. The miss-detection determination method according to claim 9, wherein the target sequence is a predetermined miss-detection test sequence, or the target sequence is a sequence formed by a combination of a demodulation reference signal (DMRS) and a void PUSCH.

11. The miss-detection determination method according to claim 9, wherein:
the feeding back the miss-detection indication information to the terminal in a case that the target sequence is detected comprises: feeding back the miss-detection indication information to the terminal in a case that a predetermined miss-detection test sequence is detected; or,
the feeding back the miss-detection indication information to the terminal in a case that the target sequence is detected comprises: continuing performing reception of a physical uplink shared channel (PUSCH) in a case that a demodulation reference signal (DMRS) is detected; feeding back the miss-detection indication information to the terminal in a case that the PUSCH is not successfully received.

12. The miss-detection determination method according to claim 9, wherein the feeding back the miss-detection indication information to the terminal comprises:
sending predetermined miss-detection indication information to the terminal by using a predetermined downlink channel; or,
sending a negative acknowledgement (NACK) message to the terminal by using a predetermined downlink channel; or,
sending downlink control information to the terminal by using a physical downlink control channel (PDCCH), wherein the downlink control information is used to schedule retransmission of a PUSCH.

13. A terminal, comprising a transceiver, a memory, a processor and a program stored in the memory and executable on the processor, wherein the processor executes the program to implement following steps:
sending a target sequence to a network device in an uplink grant-free transmission occasion; and
determining that no miss-detection occurs in the network device in a case that miss-detection indication information is received from the network device within a preset time period after sending the target sequence, and determining that miss-detection occurs in the network device in a case that the miss-detection indication information is not received from the network device within the preset time period after sending the target sequence;
wherein the processor executes the program to further implement following step:
in an uplink grant-free transmission occasion, starting to send a physical uplink shared channel (PUSCH) or continuing sending a PUSCH.

14. The terminal according to claim 13, wherein the processor executes the program to further implement following step: sending an initial transmission of the PUSCH, on a resource used for PUSCH retransmission that is indicated by the miss-detection indication information.

15. The terminal according to claim 13, wherein the target sequence is a predetermined miss-detection test sequence, or the target sequence is a sequence formed by a combination of a demodulation reference signal (DMRS) and a void PUSCH.

16. A network device, comprising a transceiver, a memory, a processor and a program stored in the memory and executable on the processor, wherein the processor executes the program to implement steps of the miss-detection determination method according to claim 9.

17. The network device according to claim 16, wherein the target sequence is a predetermined miss-detection test sequence, or the target sequence is a sequence formed by a combination of a demodulation reference signal (DMRS) and a void PUSCH.

18. The network device according to claim 16, wherein:
the processor executes the program to further implement following step: feeding back the miss-detection indication information to the terminal in a case that a predetermined miss-detection test sequence is detected; or,
the processor executes the program to further implement following steps: continuing performing reception of a physical uplink shared channel (PUSCH) in a case that a demodulation reference signal (DMRS) is detected; feeding back the miss-detection indication information to the terminal in a case that the PUSCH is not successfully received.

* * * * *